United States Patent
Takahashi et al.

(10) Patent No.: US 12,202,330 B2
(45) Date of Patent: Jan. 21, 2025

(54) BATTERY COOLING DEVICE

(71) Applicant: Valeo Japan Co., Ltd., Saitama (JP)

(72) Inventors: Osamu Takahashi, Saitama (JP); Kazuya Kurahashi, Saitama (JP)

(73) Assignee: Valeo Japan Co., Ltd., Saitama (JP)

( * ) Notice: Subject to any disclaimer, the term of this patent is extended or adjusted under 35 U.S.C. 154(b) by 0 days.

(21) Appl. No.: 18/010,927

(22) PCT Filed: Jun. 10, 2021

(86) PCT No.: PCT/JP2021/022077
§ 371 (c)(1),
(2) Date: Dec. 16, 2022

(87) PCT Pub. No.: WO2021/256365
PCT Pub. Date: Dec. 23, 2021

(65) Prior Publication Data
US 2024/0227539 A1   Jul. 11, 2024

(30) Foreign Application Priority Data
Jun. 16, 2020   (JP) .................................. 2020-103727

(51) Int. Cl.
*H01M 10/613*   (2014.01)
*B60H 1/00*   (2006.01)
(Continued)

(52) U.S. Cl.
CPC .......... *B60K 11/02* (2013.01); *B60H 1/00278* (2013.01); *B60H 1/323* (2013.01);
(Continued)

(58) Field of Classification Search
CPC .............. B60H 1/323; B60H 1/100278; B60H 2001/00307; B60H 2001/3289;
(Continued)

(56) References Cited

U.S. PATENT DOCUMENTS

| 2017/0158081 A1 | 6/2017 | Kim et al. |
| 2019/0226723 A1* | 7/2019 | Heyl ....................... F25B 49/02 |

FOREIGN PATENT DOCUMENTS

| DE | 102016215851 A1 | 3/2018 |
| EP | 3446909 A1 | 2/2019 |

(Continued)

OTHER PUBLICATIONS

English language translation of WO2020022087 to Tomotaka. Translated Sep. 2024 (Year: 2020).*

(Continued)

*Primary Examiner* — Cassey D Bauer
(74) *Attorney, Agent, or Firm* — Osha Bergman Watanabe & Burton LLP

(57) ABSTRACT

A battery cooling device capable of cooling an entire battery more evenly includes a one-side heat exchanger configured to cool a one side surface, and an other-side heat exchanger configured to cool the other side surface, which is a surface facing the one side surface. The one-side heat exchanger includes heat exchange units from a one-side first heat exchange unit to a one-side nth heat exchange unit in an order in which refrigerant flows. The other-side heat exchanger includes heat exchange units from an other-side nth heat exchange unit to an other-side first heat exchange unit in the order in which refrigerant flows. The other-side first heat exchange unit to the other-side nth heat exchange unit are provided at positions where the other-side first heat exchange unit to the other-side nth heat exchange unit face the one-side first heat exchange unit to the one-side nth heat exchange unit, respectively.

7 Claims, 5 Drawing Sheets

(51) Int. Cl.
     *B60H 1/32*           (2006.01)
     *B60K 11/02*         (2006.01)
     *H01M 10/625*      (2014.01)
     *H01M 10/6569*     (2014.01)
     *H01M 10/663*      (2014.01)

(52) U.S. Cl.
     CPC ....... *H01M 10/613* (2015.04); *H01M 10/625* (2015.04); *H01M 10/6569* (2015.04); *H01M 10/663* (2015.04); *B60H 2001/00307* (2013.01); *B60H 2001/3289* (2013.01); *H01M 2220/20* (2013.01)

(58) Field of Classification Search
     CPC ........... H01M 10/613; H01M 10/6569; H01M 10/625; H01M 10/663; H01M 2220/20; B60K 11/02
     See application file for complete search history.

(56) References Cited

FOREIGN PATENT DOCUMENTS

| | | |
|---|---|---|
| JP | 2015-096416 A | 5/2015 |
| WO | 2014-073150 A1 | 5/2014 |
| WO | WO-2020022087 A1 * | 1/2020 |

OTHER PUBLICATIONS

Extended European Search Report issued in European Application No. 21826647.6, dated Jul. 2, 2024 (8 pages).

* cited by examiner

BATTERY COOLING DEVICE

TECHNICAL FIELD

The present invention relates to a battery cooling device that cools a battery by exchanging heat with refrigerant.

BACKGROUND ART

A vehicle using a motor as a drive source has been generally known. Such a vehicle is equipped with a battery for operating a motor and a battery cooling device for cooling the battery. PTL 1 discloses a technique as a battery cooling device that cools a battery using refrigerant.

The battery cooling device disclosed in PTL 1 is configured to distribute a flow path through which the refrigerant flows to a plurality of flow paths, and cool the battery using the refrigerant flowing through each flow path.

CITATION LIST

Patent Literature

PTL 1: JP-A-2015-096416

SUMMARY OF INVENTION

Technical Problem

The refrigerant flowing through the flow path can further cool the battery on an upstream side, and a cooling performance decreases on a downstream side where an energy for cooling decreases. Therefore, a portion that is cooled more and a portion that is not cooled are mixed on a cooling surface of the battery.

An object of the invention is to provide a battery cooling device that can cool an entire battery more evenly.

Solution to Problem

In the following description, reference numerals in the accompanying drawings are appended in parentheses to facilitate understanding of the invention, but the invention is not limited to illustrated embodiments.

According to the invention, there is provided a battery cooling device (30, 30A, 30B, 30C) that is connected to a refrigeration cycle (10) including a compressor (12) that compresses refrigerant, a condenser (13) that condenses the refrigerant discharged from the compressor (12), and a refrigerant reservoir (15a) capable of storing excess refrigerant, the battery cooling device (30, 30A, 30B, 30C) including:
an expansion device (14) configured to expand the refrigerant flowing out from the refrigeration cycle (10); a refrigerant distribution device (31) configured to distribute the refrigerant flowing out from the expansion device (14) to a one-side flow path (11a) and an other-side flow path (11b); a one-side heat exchanger (40, 40A) that include a plurality of heat exchange units and through which the refrigerant flowing through the one-side flow path (11a) flows; an other-side heat exchanger (50, 50A) that include a plurality of heat exchange units and through which the refrigerant flowing through the other-side flow path (11b) flows; and a refrigerant merging device (34) configured to merge the refrigerant flowing out from the one-side heat exchanger (40, 40A) with the refrigerant flowing out from the other-side heat exchanger (50, 50A) and cause the merged refrigerant to flow out to the refrigeration cycle (10), the battery cooling device (30, 30A, 30B, 30C) cooling a battery (20) by the one-side heat exchanger (40, 40A) and the other-side heat exchanger (50, 50A), wherein the one-side heat exchanger (40, 40A) is provided on a one side surface (20u, 20r, 20f), which is any surface of the battery (20), the other-side heat exchanger (50, 50A) is provided on the other side surface (20d, 20l, 20b), which is a surface facing the one side surface (20u, 20r, 20f), regarding the heat exchange units that form the one-side heat exchanger (40, 40A), when a heat exchange unit through which the refrigerant flowing through the one-side flow path (11a) flows first is a one-side first heat exchange unit (41, 41A), and a heat exchange unit through which the refrigerant flowing out from the one-side first heat exchange unit (41, 41A) flows next is a one-side second heat exchange unit (42, 42A), the one-side heat exchanger (40, 40A) includes the heat exchange units from the one-side first heat exchange unit (41, 41A) to a one-side nth heat exchange unit (44, 44A) in an order in which the refrigerant flows, regarding the heat exchange units that form the other-side heat exchanger (50, 50A), when a heat exchange unit through which the refrigerant flowing through the other-side flow path (11b) flows first is an other-side nth heat exchange unit (54, 54A), and a heat exchange unit through which the refrigerant flowing out from the other-side nth heat exchange unit (54, 54A) flows next is an other-side (n−1)th heat exchange unit (53, 53A), the other-side heat exchanger (50, 50A) includes the heat exchange units from the other-side nth heat exchange unit (54, 54A) to an other-side first heat exchange unit (51, 51A) in the order in which the refrigerant flows, and the other-side first heat exchange unit (51, 51A) to the other-side nth heat exchange unit (54, 54A) are provided at positions where the other-side first heat exchange unit (51, 51A) to the other-side nth heat exchange unit (54, 54A) face the one-side first heat exchange unit (41, 41A) to the one-side nth heat exchange unit (44, 44A), respectively.

Preferably, the one side surface (20u) is an upper surface (20u) of the battery (20).

Preferably, the battery (20) is used by being mounted on a vehicle, and the one side surface (20r) is a right side surface (20r) of the battery (20) in a posture of the vehicle.

Preferably, the battery (20) is used by being mounted on a vehicle, and the one side surface (20r) is a right side surface (20r) of the battery (20) in a posture of the vehicle.

Preferably, the battery (20) is used by being mounted on a vehicle, and the one side surface (20f) is a front side surface (20f) of the battery (20) in a posture of the vehicle.

Preferably, the refrigerant flowing into the heat exchange units (41 to 44, 41A to 44A) that form the one-side heat exchanger (40, 40A) flows in an opposite direction with respect to the refrigerant flowing into the heat exchange units (51 to 54, 51A to 54A) that are arranged at positions where the heat exchange units (51 to 54, 51A to 54A) face the heat exchange units (41 to 44, 41A to 44A) with the battery (20) interposed therebetween and that form the other-side heat exchanger (50, 50A).

Preferably, the heat exchange units (41 to 44, 41A to 44A) that form the one-side heat exchanger (40, 40A) and the heat exchange units (51 to 54, 51A to 54A) that form the other-side heat exchanger (50, 50A) are both arranged in a horizontal direction.

Preferably, the refrigeration cycle (10) and the battery cooling device (30, 30A, 30B, 30C) are connected at a branch point D between the condenser (13) and the expansion device (14) and a merge point (J) between the refrigerant merging device (34) and the compressor (12), and the refrigeration cycle (10) includes an air-conditioning expansion device (114) and an air-conditioning evaporator (130) between the branch point (D) and the merge point (J).

Advantageous Effect

According to the invention, it is possible to provide the battery cooling device capable of cooling an entire battery more evenly.

DESCRIPTION OF EMBODIMENTS

Embodiments of the invention will be described below based on the accompanying drawings. In the description, the right means the right with reference to a traveling direction of a vehicle on which a battery cooling device is mounted, the left means the left with reference to the traveling direction as well, the front means the front with reference to the traveling direction of the vehicle on which the battery cooling device is mounted, and the rear means the rear with reference to the traveling direction as well. In the figure, Fr indicates the front, Rr indicates the rear, Le indicates the left, Ri indicates the right, Up indicates the up, and Dn indicates the down.

First Embodiment

Figure 1:
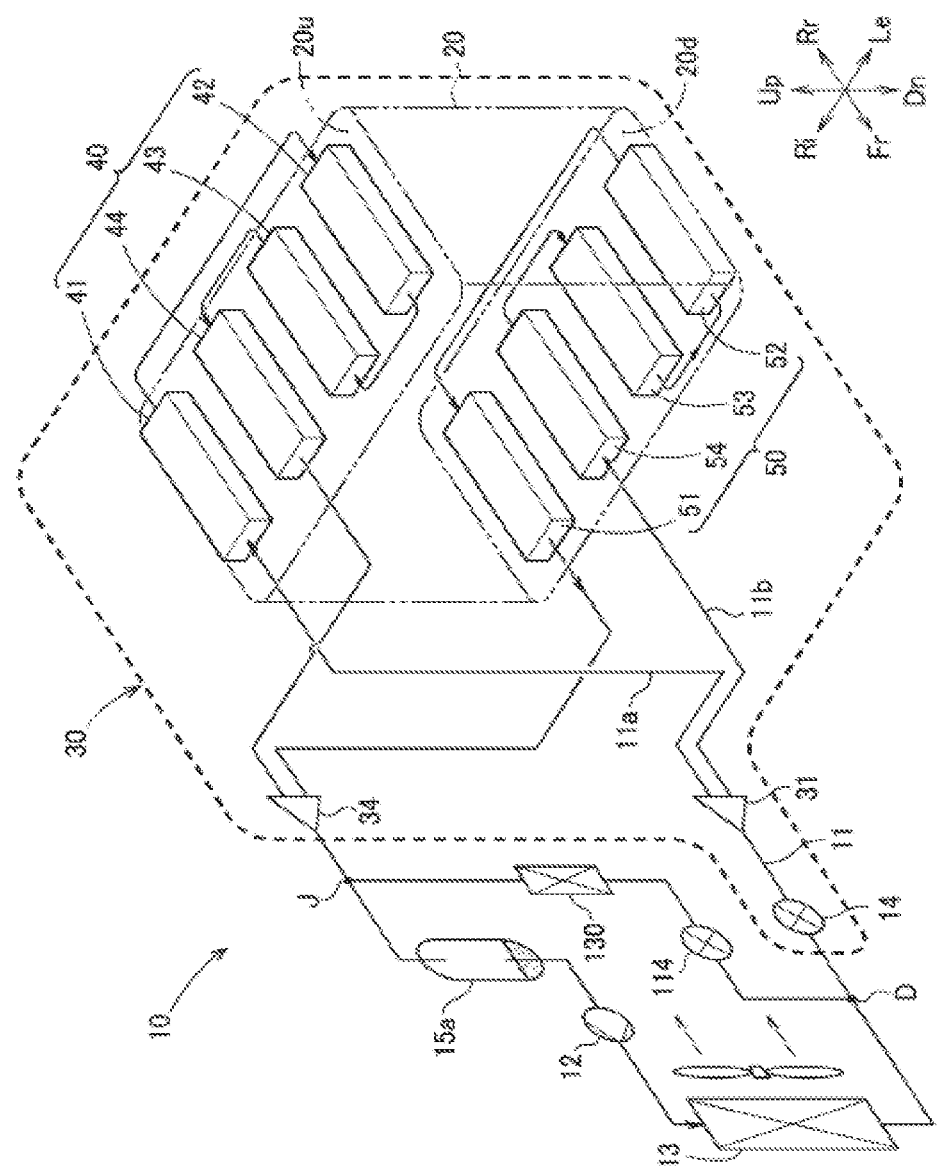
FIG. 1 is a diagram schematically showing a battery cooling device according to a first embodiment.

Refer to FIG. 1. A battery cooling device 30 is used, for example, to cool a battery 20 mounted on a vehicle. The battery 20 is used to store electric power supplied to a motor as a drive source of the vehicle, and thus the battery 20 is capable of charging, and has a characteristic of generating heat during charging. The battery 20 deteriorates when the battery 20 generates excessive heat. In addition, the battery cooling device 30 is used by being connected to a refrigeration cycle 10 through which the refrigerant is circulated. The refrigeration cycle 10 can share a part of what is used for an air conditioner of the vehicle. The refrigeration cycle 10 and the battery cooling device 30 are connected at a branch point D and a merge point J.

The refrigeration cycle 10 to which the battery cooling device 30 is connected is provided with a compressor 12 that compresses the refrigerant, a condenser 13 that cools high-temperature and high-pressure refrigerant that has passed through the compressor 12, an air-conditioning expansion device 114, and an air-conditioning evaporator 130 on a flow path 11 through which the refrigerant flows.

An accumulator 15a as a refrigerant reservoir capable of storing excess refrigerant is arranged upstream of the compressor 12. The refrigerant reservoir may be arranged as a liquid tank (not shown) between the condenser 13 and the branch point D.

The high-temperature and high-pressure refrigerant in the compressor 12 is cooled by the condenser 13 in a high-pressure state. The refrigerant that has passed through the condenser 13 reaches the branch point D, and is divided into refrigerant that circulates only in the refrigeration cycle 10, that is, flows in the accumulator 15a via the air-conditioning expansion device 114 and the air-conditioning evaporator 130, and refrigerant that flows in the battery cooling device 30. The refrigerant flowing into the battery cooling device 30 from the branch point D cools the battery 20 as described later, reaches the merge point J, and merges with the refrigerant passing through the air-conditioning evaporator 130, and the merged refrigerant flows into the accumulator 15a, and returns to the compressor 12.

The high-pressure refrigerant that has flowed into the air-conditioning expansion device 114 from the branch point D is expanded and flows into the air-conditioning condenser 130, cools blown air used for air conditioning, reaches the merge point J, and merges with the refrigerant that has flowed through the battery cooling device 30. Then, the merged refrigerant flows into the accumulator 15a and returns to the compressor 12.

The accumulator 15a of a refrigerant reservoir 15 has a function of storing the excess refrigerant, separating liquid refrigerant and gas refrigerant, and discharging only the gas refrigerant. The liquid tank has a function of storing the excess refrigerant, separating the liquid refrigerant and the gas refrigerant, and discharging only the gas refrigerant.

Figure 2:
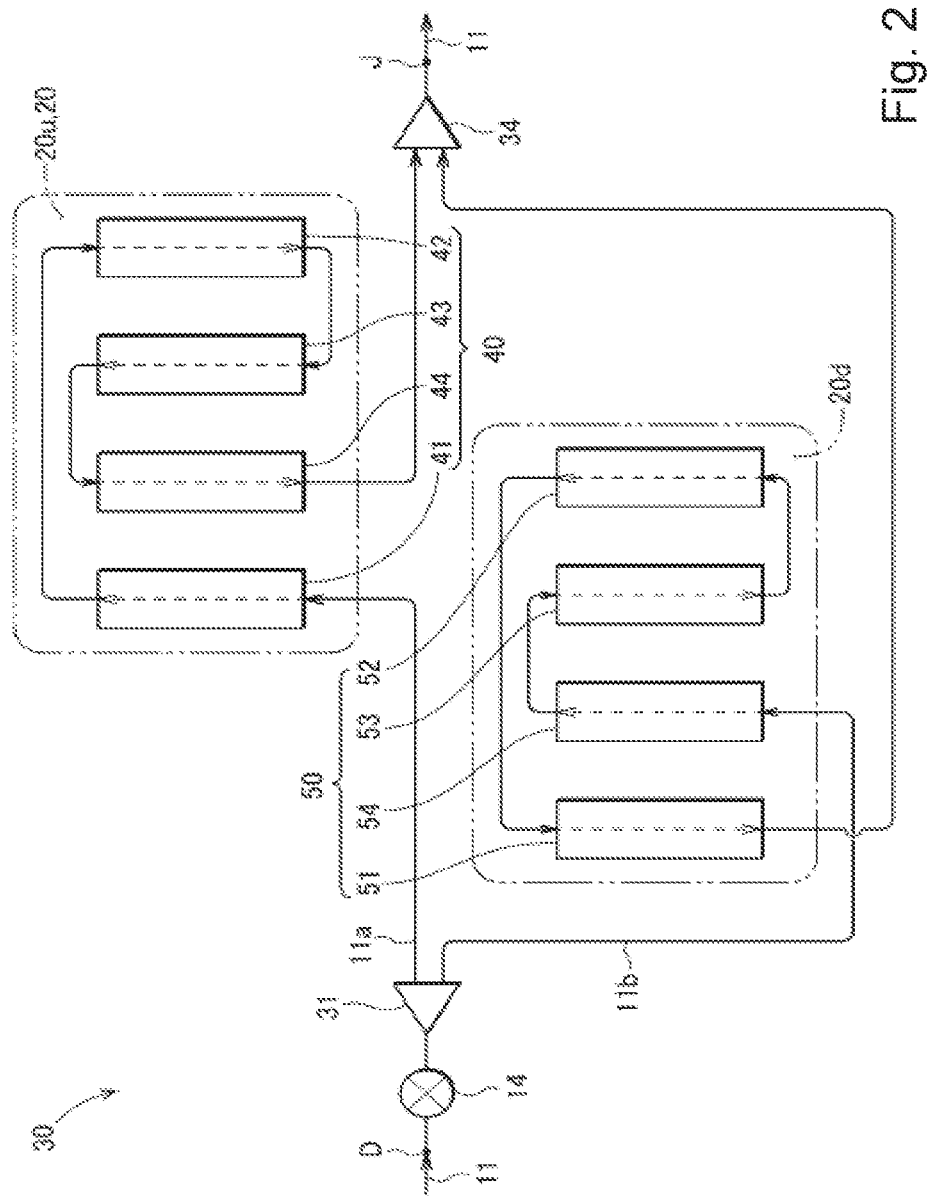
FIG. 2 is a diagram illustrating a refrigerant distributor, a one-side flow path, an other-side flow path, a one-side heat exchanger, and a refrigerant merging device shown in FIG. 1.

Also refer to FIG. 2. The battery cooling device 30 includes: an expansion device 14 that expands the high-pressure refrigerant flowing from the condenser 13 to form low-pressure refrigerant; a refrigerant distribution device 31 that distributes the low-pressure refrigerant flowing out from the expansion device 14 to a one-side flow path 11a and an other-side flow path 11b; a one-side heat exchanger 40 that include a plurality of one-side heat exchange units 41 to 44 and through which the refrigerant flowing through the one-side flow path 11a flows; an other-side heat exchanger 50 that include a plurality of other-side heat exchange units 51 to 54 and through which the refrigerant flowing through the other-side flow path 11b flows; and a refrigerant merging device 34 that merges the refrigerant flowing out from the one-side heat exchanger 40 with the refrigerant flowing out from the other-side heat exchanger 50 and causes the merged refrigerant to flow out to the refrigeration cycle 10.

Although not shown, the expansion device 14 includes: an outflow refrigerant detection unit that detects an energy of the refrigerant flowing out from the refrigerant merging device 34; an adjustment unit that adjusts a degree of expansion of the refrigerant that has passed through the condenser 13 in accordance with the energy of the refrigerant detected by the outflow refrigerant detection unit (the refrigerant that has passed through the liquid tank, in a case of the battery cooling device 30 arranged in the refrigeration cycle 10 including the liquid tank); and a valve body unit that expands the refrigerant that has passed through the condenser 13 in accordance with an adjustment amount of the adjustment unit.

The outflow refrigerant detection unit is arranged between the refrigerant merging device 34 and the merge point J, and detects a temperature or the temperature and a pressure of the refrigerant flowing out from the refrigerant merging device 34. The adjustment unit increases a flow rate of the refrigerant by relatively widening a valve opening amount of the valve body unit when the energy of the refrigerant detected by the outflow refrigerant detection unit is relatively high, and decreases the flow rate of the refrigerant by relatively narrowing the valve opening amount of the valve body unit when the energy of the refrigerant detected by the outflow refrigerant detection unit is relatively low.

It is preferable that the expansion device 14 can prevent the refrigerant that has passed through the condenser 13 from flowing through the battery device 30 by manufacturing the adjustment unit with an electronic component that can control the adjustment amount of the valve opening of the valve body unit by an external signal. When the battery cooling device 30 is provided as a part of the air conditioner of the vehicle, an operation mode in which only the air conditioner of the vehicle is operated and the battery cooling device 30 is not operated may be requested, but regardless of an energy state of the refrigerant detected by the outflow refrigerant detection unit, the flow of the refrigerant can be completely blocked to respond to the request. Such an expansion device 14 may be referred to as an electronic expansion valve having a closing function.

The one-side heat exchanger 40 is arranged on an upper surface 20*u* (a one side surface 20*u*) of the battery 20. The one-side heat exchanger 40 includes, for example, four one-side heat exchange units 41 to 44. These one-side heat exchange units 41 to 44 are referred to as a one-side first heat exchange unit 41, a one-side second heat exchange unit 42, a one-side third heat exchange unit 43, and a one-side fourth heat exchange unit 44 in an order in which the refrigerant flows. Each of the one-side heat exchange units 41 to 44 is formed with a flow path through which the refrigerant can pass inside a flat metal plate.

The number of one-side heat exchange units 41 to 44 may be two or more. When the number of one-side heat exchange units is n, it can be said that the one-side heat exchanger 40 includes the heat exchange units from the one-side first heat exchange unit 41 to a one-side nth heat exchange unit (the one-side fourth heat exchange unit 44 in the present embodiment) in the order in which the refrigerant flows.

The one-side heat exchange units 41 to 44 may have the same configuration or different configurations. However, in a case where the one-side heat exchange units 41 to 44 have the same configuration, the types of components to be prepared can be reduced, and thus the battery cooling device 30 can be made inexpensive.

Here, the one-side heat exchange units 41 to 44 are arranged in a front-rear direction (along the front-rear direction) in FIG. 1, but the arrangement direction is not limited to this. For example, although not shown, the one-side heat exchange units 41 to 44 may be arranged in a left-right direction (along the left-right direction) or may be arranged in any direction as long as the one-side heat exchange units 41 to 44 are in the same arrangement direction as the other-side heat exchange units 51 to 54.

The other-side heat exchanger 50 is arranged on a lower surface 20*d* (the other side surface 20*d*) of the battery 20. The other-side heat exchanger 50 includes, for example, four other-side heat exchange units 51 to 54. The heat exchange unit arranged at a position where the heat exchange unit faces the one-side first heat exchange unit 41 is referred to as an other-side first heat exchange unit 51. Similarly, the heat exchange unit arranged at a position where the heat exchange unit faces the one-side second heat exchange unit 42 is referred to as an other-side second heat exchange unit 52, the heat exchange unit arranged at a position where the heat exchange unit faces the one-side third heat exchange unit 43 is referred to as an other-side third heat exchange unit 53, and the heat exchange unit arranged at a position where the heat exchange unit faces the one-side fourth heat exchange unit 44 is referred to as an other-side fourth heat exchange unit 54. Each of the other-side heat exchange units 41 to 44 is formed with a flow path through which the refrigerant can pass inside a flat metal plate.

In the other-side heat exchanger 50, the refrigerant flows in an order of the other-side fourth heat exchange unit 54, the other-side third heat exchange unit 53, the other-side second heat exchange unit 52, and the other-side first heat exchange unit 51.

The number of the other-side heat exchange units 51 to 54 may be two or more and may be the same as the number of the one-side heat exchange units 41 to 44. When the number of other-side heat exchange units is n, it can be said that the refrigerant flows in an order of an other-side nth heat exchange unit (the other-side fourth heat exchange unit 54 in the present embodiment) and an other-side (n−1)th heat exchange unit (the other-side third heat exchange unit 53 in the present embodiment), and finally flows to the other-side first heat exchange unit 51.

Further, it can be said that the other-side first heat exchange unit 51 to the other-side nth heat exchange unit (the other-side fourth heat exchange unit 54 in the present embodiment) are provided at positions where the other-side first heat exchange unit 51 to the other-side nth heat exchange unit face the one-side first heat exchange unit 41 to the one side nth heat exchange unit (the one-side fourth heat exchange unit 44 in the present embodiment), respectively.

The other-side heat exchange units 41 to 44 may have the same configuration or different configurations. However, in a case where the other-side heat exchange units 51 to 54 have the same configuration, the types of components to be prepared can be reduced, and thus the battery cooling device 30 can be made inexpensive. Further, the other-side heat exchange units 51 to 54 have the same configuration as the one-side heat exchange units 41 to 44, and thus the battery cooling device 30 can be further made inexpensive.

The other-side heat exchange units 51 to 54 may be arranged in the left-right direction or may be arranged in any direction as long as the other-side heat exchange units 51 to 54 are in the same arrangement direction as the one-side heat exchange units 41 to 44. It is preferable that the one-side heat exchange units 41 to 44 and the other-side heat exchange units 51 to 54 are both arranged in a horizontal direction. The reason will be described later.

An operation of the battery cooling device 30 will be described.

The refrigerant flowing through the flow path 11 is expanded in the expansion device 14 to become refrigerant in a gas-liquid mixed state, and flows into the refrigerant distribution device 31.

The refrigerant that has flowed into the refrigerant distribution device 31 is distributed to two flow paths of the one-side flow path 11*a* and the other-side flow path 11*b*. The refrigerant flowing through the one-side flow path 11*a* flows to the one-side heat exchanger 40, and the refrigerant flowing through the other-side flow path 11*b* flows to the other-side heat exchanger 50.

The refrigerant that has flowed into the one-side heat exchanger 40 flows in the order of the one-side first heat exchange unit 41 to the one-side fourth heat exchange unit 44. The one-side heat exchanger 40 is arranged on the upper surface 20u of the battery 20. Therefore, the refrigerant flowing inside the one-side heat exchange units 41 to 44 cools the upper surface 20u of the battery 20 by heat exchange with the battery 20. A ratio of liquid refrigerant to the refrigerant in the gas-liquid mixed state flowing into the one-side heat exchanger 40 decreases as the refrigerant exchanges heat with the upper surface 20u of the battery 20. That is, the refrigerant flowing into the one-side first heat exchange unit 41 has a high cooling capacity for the battery 20, and the cooling capacity gradually decreases as the refrigerant exchanges heat with the upper surface 20u of the battery 20. The refrigerant that has flowed into the one-side fourth heat exchange unit 44 flows from the one-side heat exchanger 40 toward the refrigerant merging device 34.

The refrigerant that has flowed into the other-side heat exchanger 50 flows in the order of the other-side fourth heat exchange unit 54 to the other-side first heat exchange unit 51. The other-side heat exchanger 50 is arranged on the lower surface 20d of the battery 20. Therefore, the refrigerant flowing inside the other-side heat exchange units 51 to 54 cools the lower surface 20d of the battery 20 by heat exchange with the battery 20. A ratio of the liquid refrigerant to the refrigerant in the gas-liquid mixed state flowing into the other-side heat exchanger 50 decreases as the refrigerant exchanges heat with the lower surface 20d of the battery 20. That is, the refrigerant flowing into the other-side fourth heat exchange unit 54 has a high cooling capacity for the battery 20, and the cooling capacity gradually decreases as the refrigerant exchanges heat with the lower surface 20d of the battery 20. The refrigerant that has flowed into the other-side first heat exchange unit 51 flows from the other-side heat exchanger 50 toward the refrigerant merging device 34.

The refrigerant that has flowed through the one-side flow path 11a or the other-side flow path 11b merges in the refrigerant merging device 34 and flows toward the accumulator 15a included in the refrigeration cycle.

The refrigerant flowing through the one-side first heat exchange unit 41 flows from the front to the rear. When this direction is set as a first direction, the refrigerant flowing through the other-side first heat exchange unit 51 arranged at a position where the other-side first heat exchange unit 51 faces the one-side first heat exchange unit 41 flows from the rear to the front. This direction is set as a second direction opposite to the first direction. The refrigerant flowing through the one-side second heat exchange unit 42 flows from the rear to the front. When this direction is set as a first direction, the refrigerant flowing through the other-side second heat exchange unit 52 arranged at a position where the other-side second heat exchange unit 52 faces the one-side second heat exchange unit 42 flows in a second direction opposite to the first direction.

That is, when the direction of the refrigerant flowing through the one-side heat exchange units 41 to 44 is the first direction, it can be said that the direction of the refrigerant flowing through the other-side heat exchange units 51 to 54 arranged at the positions where the other-side heat exchange units 51 to 54 face the one-side heat exchange units 41 to 44 is the second direction opposite to the first direction.

The battery cooling device 30 described above achieves the following effects.

Refer to FIGS. 1 and 2. The one-side first heat exchange unit 41 to the one-side fourth heat exchange unit 44 (the one-side nth heat exchange unit) that form the one-side heat exchanger 40 are arranged on the upper surface 20u of the battery. In addition, the other-side first heat exchange unit 51 to the other-side fourth heat exchange unit 54 (the other-side nth heat exchange unit) that form the other-side heat exchanger 50 are arranged at the positions on the lower surface 20d where the other-side first heat exchange unit 51 to the other-side fourth heat exchange unit 54 face the one-side first heat exchange unit 41 to the one-side fourth heat exchange unit 44. The refrigerant flows through the one-side heat exchanger 40 in the order of the one-side first heat exchange unit 41 to the one-side fourth heat exchange unit 44, and the refrigerant flows through the other-side heat exchanger 50 in the order of the other-side fourth heat exchange unit 54 to the other-side first heat exchange unit 51. The refrigerant flowing through the one-side flow path 11a has the highest cooling capacity for the battery 20 when flowing into the one-side first heat exchange unit 41, and has the lowest cooling capacity for the battery 20 when flowing out from the one-side fourth heat exchange unit 44. On the other hand, the refrigerant flowing through the other-side flow path 11b has the highest cooling capacity for the battery 20 when flowing into the other-side fourth heat exchange unit 54, and has the lowest cooling capacity for the battery 20 when flowing out from the other-side first heat exchange unit 51.

As described above, focusing only on the upper surface 20u, the cooling capacity may vary from the one-side first heat exchange unit 41 to the one-side fourth heat exchange unit 44. Similarly, focusing only on the lower surface 20d, the cooling capacity may vary from the other-side fourth heat exchange unit 54 to the other-side first heat exchange unit 51. However, the one-side first heat exchange unit 41 to the one-side fourth heat exchange unit 44 and the other-side fourth heat exchange unit 54 to the other-side first heat exchange unit 51 are provided at the positions facing each other, and thus the one-side first heat exchange unit 41 having the highest cooling capacity in the one-side heat exchanger 40 can compensate for the shortage of the cooling capacity of the other-side first heat exchange unit 51 having the lowest cooling capacity in the other-side heat exchanger 50. Similarly, the one-side second heat exchange unit 42 having the second highest cooling capacity in the one-side heat exchanger 40 can compensate for the shortage of the cooling capacity of the other-side second heat exchange unit 52 having the second lowest cooling capacity in the other-side heat exchanger 50. The same applies to a relationship between the cooling capacities of the other-side third heat exchange unit 53 and the one-side third heat exchange unit 43, and a relationship between the cooling capacities of the other-side fourth heat exchange unit 54 and the one-side fourth heat exchange unit 44. Therefore, the variation in the cooling capacity of the one-side heat exchanger 40 and the variation in the cooling capacity of the other-side heat exchanger 50 can be mutually complemented by reversing the flowing orders of the refrigerant between the upper surface 20u and the lower surface 20d, and thus the entire battery 20 can be cooled without temperature variation.

Further, the refrigerant flow in the opposite directions between the one-side heat exchange units 41 to 44 and the other-side heat exchange units 51 to 54 (so-called counter-flow). Accordingly, the entire battery 20 can be cooled more evenly.

Second Embodiment

Next, a battery cooling device according to a second embodiment will be described with reference to the drawings.

Figure 3:
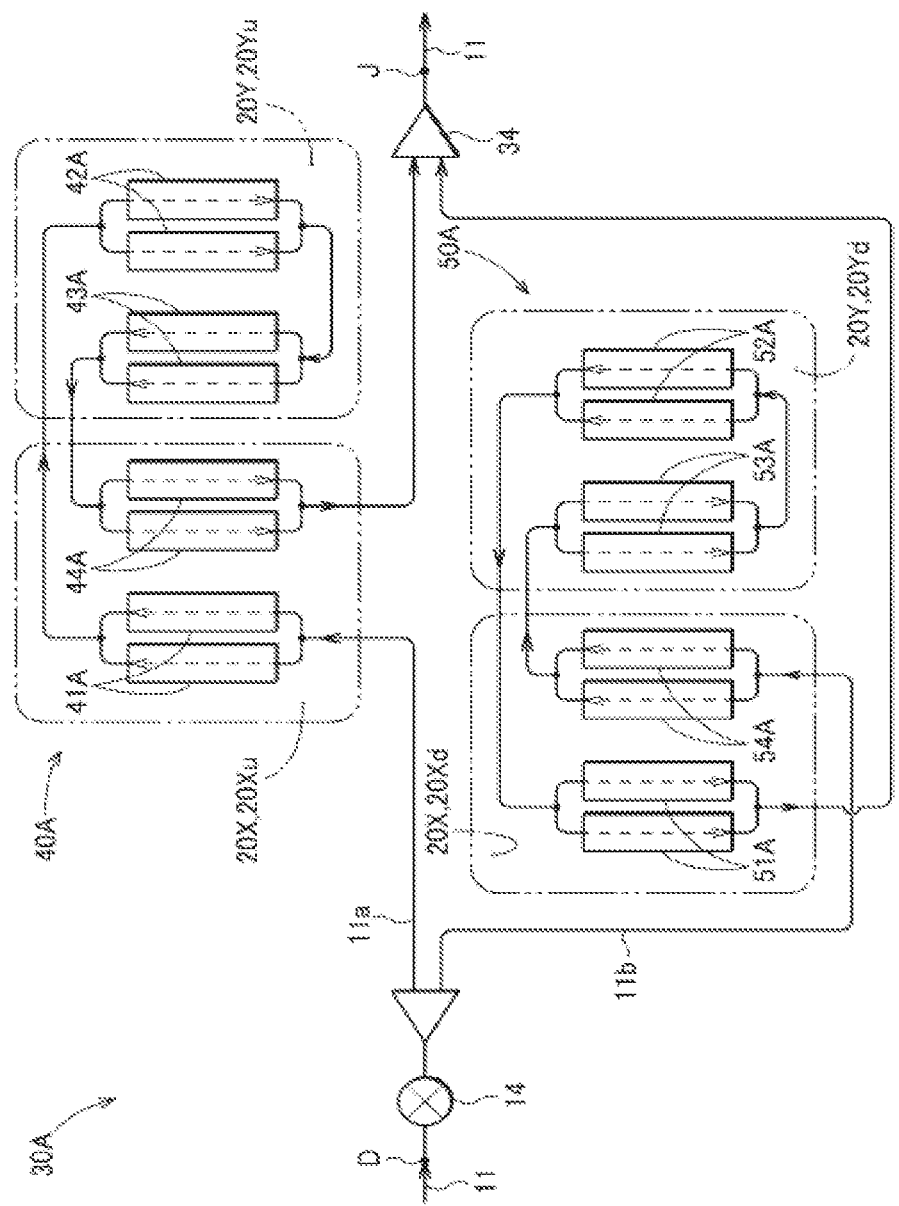
FIG. 3 is a diagram schematically showing a structure of a battery cooling device according to a second embodiment.

FIG. 3 shows a battery cooling device 30A according to the second embodiment, which is represented in correspondence with FIG. 2 above. A basic configuration is the same as that of the battery cooling device 30 (see FIG. 1) according to the first embodiment. Parts common to the first embodiment are denoted by the same reference numerals, and detailed description thereof will be omitted.

The battery cooling device 30A cools two batteries 20X, 20Y (a first battery 20X and a second battery 20Y). The battery cooling device 30A can also be used to cool three or more batteries 20.

A one-side heat exchanger 40A includes four sets of one-side heat exchange units 41A to 44A. A configuration of each of the one-side heat exchange units 41A to 44A is the same as that of each of the one-side heat exchange units 41 to 44 shown in FIG. 1. In each of the one-side heat exchange units 41A to 44A, two heat exchange units are arranged in parallel. One-side first heat exchange units 41A, 41A and one-side fourth heat exchange units 44A, 44A both come into contact with an upper surface 20Xu of the first battery 20X, and one-side second heat exchange units 42A, 42A and one-side third heat exchange units 43A, 43A both come into contact with an upper surface 20Yu of the second battery 20Y.

In the one-side first heat exchange units 41A, 41A arranged in parallel, the one-side flow path 11a branches on an upstream side of the one-side first heat exchange units 41A, 41A, and the branched one-side flow paths 11a merge on a downstream side of the one-side first heat exchange units 41A, 41A. The same applies to the one-side heat exchange units 42A to 44A.

The same applies to an other-side heat exchanger 50A. That is, the other-side heat exchanger 50A includes four sets of other-side heat exchange units 51A to 54A. A configuration of each of the other-side heat exchange units 51A to 54A is the same as that of each of the other-side heat exchange units 51 to 54 shown in FIG. 1. In each of the other-side heat exchange units 51A to 54A, two heat exchange units are arranged in parallel. Other-side first heat exchange units 51A, 51A and other-side fourth heat exchange units 54A, 54A both come into contact with a lower surface 20Xd of the first battery 20x, and other-side second heat exchange units 52A, 52A and other-side third heat exchange units 53A, 53A both come into contact with a lower surface 20Yd of the second battery 20Y.

In the other-side first heat exchange units 51A, 51A arranged in parallel, the other-side flow path 11b branches on an upstream side of the other-side first heat exchange units 51A, 51A, and the branched other-side flow paths 11b merge on a downstream side of the other-side first heat exchange units 51A, 51A. The same applies to the other-side heat exchange units 52A to 54A.

The one-side heat exchange units 41A to 44A and the other-side heat exchange units 51A to 54A may each include three or more heat exchange units arranged in parallel.

The battery cooling device 30A described above also achieves predetermined effects of the invention.

Third Embodiment

A battery cooling device according to a third embodiment will be described with reference to the drawings.

Figure 4:
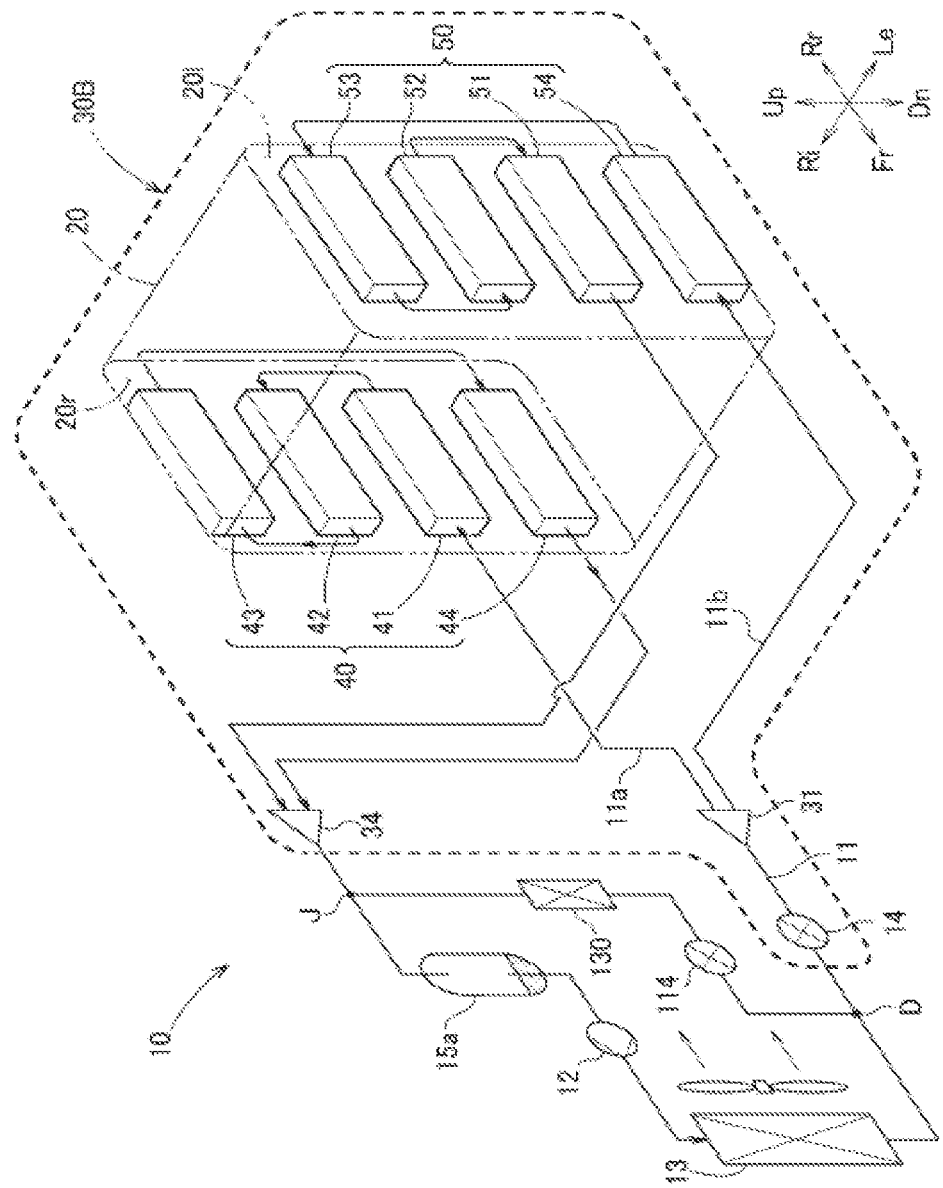
FIG. 4 is a diagram schematically showing a structure of a battery cooling device according to a third embodiment.

FIG. 4 shows a battery cooling device 30B according to the third embodiment, which is represented in correspondence with FIG. 1 above. A basic configuration is the same as that of the battery cooling device 30 (see FIG. 1) according to the first embodiment. Parts common to the first embodiment are denoted by the same reference numerals, and detailed description thereof will be omitted.

The one-side heat exchanger 40 is arranged on a right side surface 20r of the battery 20, and the other-side heat exchanger 50 is arranged on a left side surface 20l of the battery 20. That is, a one side surface is the right side surface 20r, and the other side surface is the left side surface 20l.

The one-side heat exchange units 41 to 44 and the other-side heat exchange units 51 to 54 may be arranged in an up-down direction (along the up-down direction) or may be arranged in any direction based on a shape of the battery 20 and other circumstances. However, the refrigerant in the gas-liquid mixed state flows through the inside of the one-side heat exchanger 40 and the other-side heat exchanger 50, particularly the liquid refrigerant is easily affected by gravity, and thus the one-side heat exchanger 40 and the other-side heat exchanger 50 are preferably arranged in the front-rear direction (arranged in the horizontal direction) as shown in FIG. 4. A temperature distribution at a time of cooling the battery 20 can be reduced by eliminating a cause of the liquid refrigerant collecting due to gravity on an inlet side or an outlet side of each heat exchange unit of the one-side heat exchange units 41 to 44 and the other-side heat exchange units 51 to 54.

The battery cooling device 30B described above also achieves the predetermined effects of the invention.

Fourth Embodiment

Next, a battery cooling device according to a fourth embodiment will be described with reference to the drawings.

Figure 5:
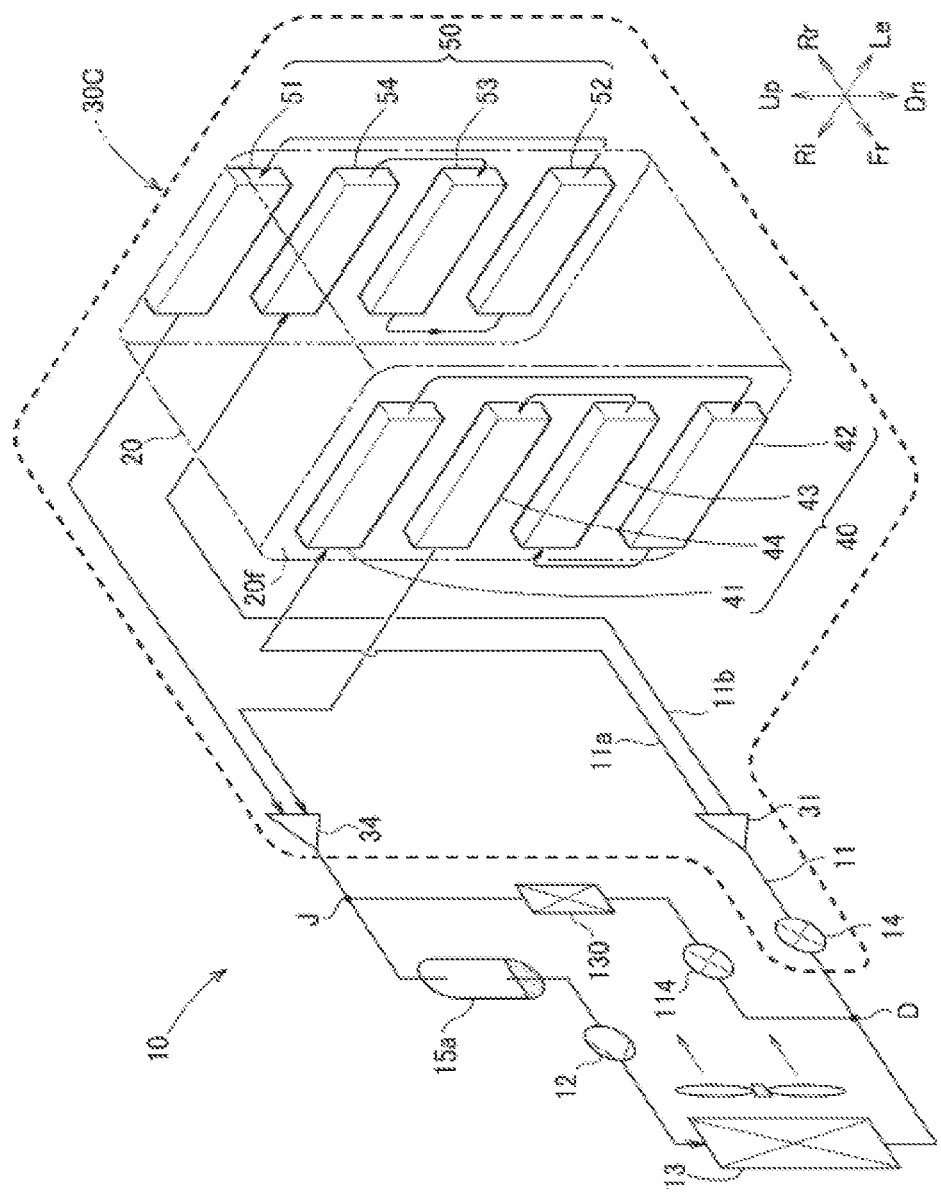
FIG. 5 is a diagram schematically showing a structure of a battery cooling device according to a fourth embodiment.

FIG. 5 shows a battery cooling device 30C according to the fourth embodiment, which is represented in correspondence with FIG. 1 above. A basic configuration is the same as that of the battery cooling device 30 (see FIG. 1) according to the first embodiment. Parts common to the first embodiment are denoted by the same reference numerals, and detailed description thereof will be omitted.

The one-side heat exchanger 40 is arranged on a front side surface 20f of the battery 20, and the other-side heat exchanger 50 is arranged on a rear side surface 20b of the battery 20. That is, a one side surface is the front side surface 20f, and the other side surface is the rear side surface 20b.

The one-side heat exchange units 41 to 44 and the other-side heat exchange units 51 to 54 may be arranged in the up-down direction (along the up-down direction) based on the shape of the battery 20 and the other circumstances. However, the refrigerant in the gas-liquid mixed state flows through the inside of the one-side heat exchanger 40 and the other-side heat exchanger 50, particularly the liquid refrigerant is easily affected by the gravity, and thus the one-side heat exchanger 40 and the other-side heat exchanger 50 are preferably arranged in the left-right direction (arranged in the horizontal direction) as shown in FIG. 5. A temperature distribution at the time of cooling the battery 20 can be reduced by eliminating a cause of the liquid refrigerant collecting due to gravity on the inlet side or the outlet side of each heat exchange unit of the one-side heat exchange units 41 to 44 and the other-side heat exchange units 51 to 54.

The battery cooling device 30C described above also achieves the predetermined effects of the invention.

The battery cooling device according to the invention is not limited to that mounted on a hybrid vehicle, and can also be mounted on an electric vehicle, a straddle type vehicle using a motor, means of transportation other than the vehicle, a construction machine, and the like.

The refrigeration cycle 10 can be provided independently without sharing a part of the air conditioner.

The embodiments can be combined as appropriate. For example, the heat exchange unit on the one side surface can include a single heat exchange unit as shown in FIG. 2, and the heat exchange unit on the other side surface can include one set of heat exchange units arranged in parallel as shown in FIG. 3. In addition, the single heat exchange unit and one set of heat exchange units may be arranged in combination on the one side surface. Further, one set of heat exchange units arranged in parallel can also be arranged on the left and right side surfaces or the front and rear side surfaces of the battery.

The invention is not limited to the embodiments as long as operations and effects of the invention are achieved.

INDUSTRIAL APPLICABILITY

The battery cooling device of the invention is suitable for being mounting on the vehicle that uses the motor as the drive source.

REFERENCE SIGN LIST 10 refrigeration cycle
11 flow path, 11a one-side flow path, 11b other-side flow path
12 compressor
13 condenser
14 expansion device
15a accumulator (refrigerant reservoir)
20 battery, 20u upper surface (one side surface), 20d lower surface (other side surface), 20r right side surface (one side surface), 20l left (other side surface), 20f front side surface (one side surface), 20b rear side surface (other side surface)
30, 30A, 30B, 30C battery cooling device
31 refrigerant distribution device
34 refrigerant merging device
40, 40A one-side heat exchanger
41, 41A one-side first heat exchange unit
44, 44A one-side fourth heat exchange unit (one-side nth heat exchange unit)
50, 50A other-side heat exchanger
51, 51A other-side first heat exchange unit
53, 53A other-side third heat exchange unit (other-side (n−1)th heat exchange unit)
54, 54A other-side fourth heat exchange unit (other-side nth heat exchange unit)

The invention claimed is:

1. A battery cooling device that is connected to a refrigeration cycle including a compressor that compresses refrigerant, a condenser that condenses the refrigerant discharged from the compressor, and a refrigerant reservoir capable of storing excess refrigerant, the battery cooling device comprising:
an expansion device configured to expand the refrigerant flowing out from the refrigeration cycle;
a refrigerant distribution device configured to distribute the refrigerant flowing out from the expansion device to a one-side flow path and an other-side flow path;
a one-side heat exchanger that include a plurality of heat exchange units and through which the refrigerant flowing through the one-side flow path flows;
an other-side heat exchanger that include a plurality of heat exchange units and through which the refrigerant flowing through the other-side flow path flows; and
a refrigerant merging device configured to merge the refrigerant flowing out from the one-side heat exchanger with the refrigerant flowing out from the other-side heat exchanger and cause the merged refrigerant to flow out to the refrigeration cycle,
the battery cooling device cooling a battery by the one-side heat exchanger and the other-side heat exchanger,
wherein the one-side heat exchanger is provided on a one side surface, which is any surface of the battery, and the other-side heat exchanger is provided on the other side surface, which is a surface facing the one side surface,
wherein the heat exchange units that form the one-side heat exchanger, when a heat exchange unit through which the refrigerant flowing through the one-side flow path flows first is a one-side first heat exchange unit, and a heat exchange unit through which the refrigerant flowing out from the one-side first heat exchange unit flows next is a one-side second heat exchange unit, the one-side heat exchanger includes the heat exchange units from the one-side first heat exchange unit to a one-side nth heat exchange unit in an order in which the refrigerant flows,
wherein the heat exchange units that form the other-side heat exchanger, when a heat exchange unit through which the refrigerant flowing through the other-side flow path flows first is an other-side nth heat exchange unit, and a heat exchange unit through which the refrigerant flowing out from the other-side nth heat exchange unit flows next is an other-side (n−1)th heat exchange unit, the other-side heat exchanger includes the heat exchange units from the other-side nth heat exchange unit to an other-side first heat exchange unit in the order in which the refrigerant flows, and
the other-side first heat exchange unit to the other-side nth heat exchange unit are provided at positions where the other-side first heat exchange unit to the other-side nth heat exchange unit face the one-side first heat exchange unit to the one-side nth heat exchange unit, respectively.

2. The battery cooling device according to claim 1, wherein the one side surface is an upper surface of the battery.

3. The battery cooling device according to claim 1, wherein the battery is used by being mounted on a vehicle, and the one side surface is a right side surface of the battery in a posture of the vehicle.

4. The battery cooling device according to claim 1, wherein the battery is used by being mounted on a vehicle, and the one side surface is a front side surface of the battery in a posture of the vehicle.

5. The battery cooling device according to claim 1, wherein
the refrigerant flowing into the heat exchange units that form the one-side heat exchanger flows in an opposite direction with respect to the refrigerant flowing into the heat exchange units that are arranged at positions where the heat exchange units face the heat exchange units with the battery interposed therebetween and that form the other-side heat exchanger.

6. The battery cooling device according to claim 1, wherein the heat exchange units that form the one-side heat exchanger and the heat exchange units that form the other-side heat exchanger are both arranged in a horizontal direction.

7. The battery cooling device according to claim 1, wherein
   the refrigeration cycle and the battery cooling device are connected at a branch point between the condenser and the expansion device and a merge point between the refrigerant merging device and the compressor, and
   the refrigeration cycle includes an air-conditioning expansion device and an air-conditioning evaporator between the branch point and the merge point.

* * * * *